United States Patent
Charles

(10) Patent No.: US 9,877,495 B2
(45) Date of Patent: Jan. 30, 2018

(54) METHOD OF MAKING A SWEETENED SOLUBLE BEVERAGE PRODUCT

(71) Applicant: Starbucks Corporation, Seattle, WA (US)

(72) Inventor: Christopher Charles, Seattle, WA (US)

(73) Assignee: STARBUCKS CORPORATION, Seattle, WA (US)

( * ) Notice: Subject to any disclaimer, the term of this patent is extended or adjusted under 35 U.S.C. 154(b) by 291 days.

(21) Appl. No.: 14/594,041

(22) Filed: Jan. 9, 2015

(65) Prior Publication Data

US 2016/0198732 A1 Jul. 14, 2016

(51) Int. Cl.
| | |
|---|---|
| A23F 5/46 | (2006.01) |
| A23F 5/26 | (2006.01) |
| B65D 85/804 | (2006.01) |
| B65B 29/02 | (2006.01) |

(52) U.S. Cl.
CPC .............. *A23F 5/465* (2013.01); *A23F 5/262* (2013.01); *B65B 29/02* (2013.01); *B65D 85/8043* (2013.01)

(58) Field of Classification Search
CPC ..... A23F 5/262; A23F 5/465; B65D 85/8043; B65B 29/02
See application file for complete search history.

(56) References Cited

U.S. PATENT DOCUMENTS

| | | |
|---|---|---|
| 2,728,678 A | 12/1955 | Sharp |
| 3,373,043 A | 3/1968 | Rubenstein |
| 3,446,624 A | 5/1969 | Luedtke |
| 3,652,293 A | 3/1972 | Lombana et al. |
| 3,769,032 A | 10/1973 | Lubsen et al. |
| 3,796,031 A | 3/1974 | Clontz |
| 3,796,032 A | 3/1974 | Clontz |
| 4,136,202 A | 1/1979 | Favre |
| 4,471,689 A | 9/1984 | Piana |
| 4,550,024 A | 10/1985 | le Granse |
| 4,555,894 A | 12/1985 | Illy |
| 4,572,719 A | 2/1986 | Theobald |
| 4,852,333 A | 8/1989 | Illy |
| 4,853,234 A | 8/1989 | Bentley et al. |
| 4,860,645 A | 8/1989 | van der Lijn et al. |
| 4,948,018 A | 8/1990 | Tansley et al. |
| 4,995,310 A | 2/1991 | van der Lijn et al. |
| 4,996,066 A | 2/1991 | Love et al. |

(Continued)

FOREIGN PATENT DOCUMENTS

| | | |
|---|---|---|
| CA | 2119178 A1 | 9/1994 |
| CA | 2330615 A1 | 9/2000 |

(Continued)

OTHER PUBLICATIONS

Ahlstrom Corporation, "CD50122M Provisional Datasheet," 2011, in 1 page.

(Continued)

*Primary Examiner* — Anthony Weier
(74) *Attorney, Agent, or Firm* — Knobbe, Martens, Olson & Bear, LLP

(57) ABSTRACT

Present embodiments generally relate to a sweetened soluble beverage component and a single-serve beverage cartridge for use with a single-serve coffee brewer. In some embodiments, the cartridge includes a cup, a lid and a single serving of sweetened soluble beverage component.

12 Claims, 4 Drawing Sheets

(56) References Cited

U.S. PATENT DOCUMENTS

| | | | |
|---|---|---|---|
| 5,008,013 A | 4/1991 | Favre et al. |
| D320,529 S | 10/1991 | Newman et al. |
| D320,530 S | 10/1991 | Newman et al. |
| 5,082,676 A | 1/1992 | Love et al. |
| 5,325,765 A | 7/1994 | Sylvan et al. |
| 5,472,719 A | 12/1995 | Favre |
| 5,555,790 A | 9/1996 | Ackermann |
| 5,573,841 A | 11/1996 | Adam et al. |
| 5,637,335 A | 6/1997 | Fond et al. |
| 5,656,311 A | 8/1997 | Fond |
| 5,773,067 A | 6/1998 | Bassereau |
| 5,836,326 A | 11/1998 | Inkster |
| 5,840,189 A | 11/1998 | Sylvan et al. |
| 5,866,185 A | 2/1999 | Burkett |
| 5,897,899 A | 4/1999 | Fond |
| 5,948,455 A | 9/1999 | Schaeffer et al. |
| D452,433 S | 12/2001 | Lazaris |
| D452,434 S | 12/2001 | Sweeney |
| 6,510,783 B1 | 1/2003 | Basile et al. |
| D474,110 S | 5/2003 | Sweeney |
| D474,111 S | 5/2003 | Lazaris |
| 6,589,577 B2 | 7/2003 | Lazaris |
| 6,607,762 B2 | 8/2003 | Lazaris et al. |
| 6,645,537 B2 | 11/2003 | Sweeney et al. |
| 6,658,989 B2 | 12/2003 | Sweeney et al. |
| 6,698,333 B2 | 3/2004 | Halliday et al. |
| 6,740,345 B2 | 5/2004 | Cai |
| 6,777,007 B2 | 8/2004 | Cai |
| 6,849,285 B2 | 2/2005 | Masek et al. |
| D502,362 S | 3/2005 | Lazaris et al. |
| 6,869,627 B2 | 3/2005 | Perkovic et al. |
| D506,926 S | 7/2005 | Halliday et al. |
| 6,948,420 B2 | 9/2005 | Green et al. |
| D513,152 S | 12/2005 | Cahen |
| 7,028,604 B2 | 4/2006 | Cortese |
| 7,069,837 B2 | 7/2006 | Sachtleben |
| D530,626 S | 10/2006 | Tanja |
| D539,643 S | 4/2007 | Abel |
| 7,213,506 B2 | 5/2007 | Halliday et al. |
| 7,219,598 B2 | 5/2007 | Halliday et al. |
| 7,243,598 B2 | 7/2007 | Halliday et al. |
| 7,287,461 B2 | 10/2007 | Halliday et al. |
| 7,308,851 B2 | 12/2007 | Halliday |
| 7,322,277 B2 | 1/2008 | Halliday et al. |
| 7,328,651 B2 | 2/2008 | Halliday et al. |
| 7,377,089 B2 | 5/2008 | Rapparini |
| 7,412,921 B2 | 8/2008 | Hu et al. |
| 7,418,899 B2 | 9/2008 | Halliday et al. |
| 7,340,990 B2 | 11/2008 | Halliday et al. |
| 7,469,628 B2 | 12/2008 | Mandralis et al. |
| 7,533,603 B2 | 5/2009 | Halliday et al. |
| 7,533,604 B2 | 5/2009 | Halliday et al. |
| 7,543,527 B2 | 6/2009 | Schmed |
| 7,552,672 B2 | 6/2009 | Schmed |
| 7,569,243 B2 | 8/2009 | Yoakim et al. |
| 7,578,419 B2 | 8/2009 | Greenwald et al. |
| 7,592,027 B2 | 9/2009 | Halliday et al. |
| 7,594,470 B2 | 9/2009 | Cox, Jr. et al. |
| 7,604,826 B2 | 10/2009 | Denisart et al. |
| 7,624,673 B2 | 12/2009 | Zanetti |
| 7,640,843 B2 | 1/2010 | Halliday et al. |
| 7,651,015 B2 | 1/2010 | Girard et al. |
| 7,658,141 B2 | 2/2010 | Masek et al. |
| 7,673,558 B2 | 3/2010 | Panesar et al. |
| 7,681,492 B2 | 3/2010 | Suggi Liverani et al. |
| 7,685,931 B2 | 3/2010 | Rivera |
| 7,703,383 B2 | 4/2010 | Knitel |
| 7,790,211 B2 | 9/2010 | Eijsackers et al. |
| 7,798,054 B2 | 9/2010 | Evers et al. |
| D624,785 S | 10/2010 | Rousselin |
| 7,815,953 B2 | 10/2010 | Mastropasqua et al. |
| 7,828,020 B2 | 11/2010 | Girard et al. |
| 7,832,328 B2 | 11/2010 | Koeling et al. |
| 7,836,819 B2 | 11/2010 | Suggi Liverani et al. |
| 7,878,108 B2 | 2/2011 | Mock et al. |
| 7,891,286 B2 | 2/2011 | Cox, Jr. et al. |
| 7,896,202 B2 | 3/2011 | Greenwald et al. |
| 7,921,766 B2 | 4/2011 | Halliday et al. |
| 7,926,415 B2 | 4/2011 | Yoakim et al. |
| D637,484 S | 5/2011 | Winkler |
| 7,946,217 B2 | 5/2011 | Favre et al. |
| 7,947,316 B2 | 5/2011 | Kirschner et al. |
| 7,964,230 B2 | 6/2011 | Kirschner et al. |
| 7,981,451 B2 | 7/2011 | Ozanne |
| 8,028,867 B2 | 10/2011 | Sterngold et al. |
| 8,033,211 B2 | 10/2011 | Halliday et al. |
| 8,039,029 B2 | 10/2011 | Ozanne |
| 8,039,036 B2 | 10/2011 | Knitel et al. |
| 8,043,645 B2 | 10/2011 | Robinson et al. |
| 8,069,775 B2 | 12/2011 | Russo |
| 8,109,200 B2 | 2/2012 | Hansen |
| 8,114,457 B2 | 2/2012 | Robinson et al. |
| 8,114,458 B2 | 2/2012 | Robinson et al. |
| 8,114,459 B2 | 2/2012 | Robinson et al. |
| 8,147,886 B2 | 4/2012 | Knitel et al. |
| 8,147,887 B2 | 4/2012 | Dogan et al. |
| 8,161,868 B2 | 4/2012 | Bolzicco et al. |
| 8,163,318 B2 | 4/2012 | Bourdeau et al. |
| 8,168,247 B2 | 5/2012 | Halliday et al. |
| 8,186,264 B2 | 5/2012 | Rijskamp et al. |
| 8,210,396 B2 | 7/2012 | Girard et al. |
| 8,225,710 B2 | 7/2012 | De Graaf et al. |
| 8,225,712 B2 | 7/2012 | Bunke et al. |
| 8,230,775 B2 | 7/2012 | Vanni |
| 8,257,766 B2 | 9/2012 | Yoakim et al. |
| 8,263,148 B2 | 9/2012 | Yoakim et al. |
| 8,322,271 B2 | 9/2012 | Glucksman et al. |
| 8,307,754 B2 | 11/2012 | Ternite et al. |
| 8,312,806 B2 | 11/2012 | De Graaf et al. |
| 8,327,754 B2 | 12/2012 | Kirschner et al. |
| 8,414,953 B2 | 4/2013 | Robinson et al. |
| 8,425,957 B2 | 4/2013 | Steenhof et al. |
| 8,443,717 B2 | 5/2013 | Venturi |
| 8,464,630 B2 | 6/2013 | Suggi Liverani et al. |
| 8,464,631 B2 | 6/2013 | Suggi Liverani et al. |
| 8,464,632 B2 | 6/2013 | Suggi Liverani et al. |
| 8,524,306 B2 | 9/2013 | Robinson et al. |
| 8,535,743 B2 | 9/2013 | Kamerbeek et al. |
| 8,535,748 B2 | 9/2013 | Robinson et al. |
| 8,541,042 B2 | 9/2013 | Robinson et al. |
| 8,563,058 B2 | 10/2013 | Roulin et al. |
| 8,617,627 B2 | 12/2013 | Steenhof et al. |
| RE44,759 E | 2/2014 | Steenhof et al. |
| 8,656,827 B2 | 2/2014 | Vanni |
| 8,752,478 B2 | 6/2014 | Nocera |
| 8,758,844 B2 | 6/2014 | Nocera |
| 8,784,915 B2 | 7/2014 | Evers et al. |
| 8,800,820 B2 | 8/2014 | Girard et al. |
| 8,808,777 B2 | 8/2014 | Kamerbeek et al. |
| 8,839,710 B2 | 9/2014 | Accursi |
| 8,906,435 B2 | 12/2014 | Kamerbeek et al. |
| 8,962,049 B2 | 2/2015 | Doleac et al. |
| 2001/0000570 A1 | 5/2001 | Aarts |
| 2002/0078831 A1 | 6/2002 | Cai |
| 2002/0098268 A1 | 7/2002 | Cohen et al. |
| 2002/0072231 A1 | 9/2002 | Liao et al. |
| 2003/0012850 A1 | 1/2003 | Turmel |
| 2003/0096038 A1 | 5/2003 | Cai |
| 2004/0005384 A1 | 1/2004 | Cai |
| 2004/0115310 A1 | 6/2004 | Yoakim et al. |
| 2005/0003060 A1 | 1/2005 | Steenhof et al. |
| 2005/0051478 A1 | 3/2005 | Karanikos et al. |
| 2005/0150390 A1 | 7/2005 | Schifferle |
| 2005/0150391 A1 | 7/2005 | Schifferle |
| 2005/0158426 A1 | 7/2005 | Hu et al. |
| 2005/0166763 A1 | 8/2005 | Cox et al. |
| 2005/0183581 A1 | 8/2005 | Kirschner et al. |
| 2005/0266122 A1 | 12/2005 | Franceschi |
| 2006/0011066 A1 | 1/2006 | Bunn et al. |
| 2006/0065127 A1 | 3/2006 | Dalton et al. |
| 2006/0075903 A1 | 4/2006 | Dijs |
| 2006/0219098 A1 | 10/2006 | Mandralis et al. |
| 2006/0236871 A1 | 10/2006 | Ternite et al. |
| 2006/0280841 A1 | 12/2006 | Cai |

(56) References Cited

U.S. PATENT DOCUMENTS

| | | |
|---|---|---|
| 2007/0122526 A1 | 5/2007 | Sweeney et al. |
| 2007/0148290 A1 | 6/2007 | Ternite et al. |
| 2007/0157822 A1 | 7/2007 | Fusco |
| 2007/0158366 A1 | 7/2007 | Van Deer Meer et al. |
| 2007/0163446 A1 | 7/2007 | Halliday et al. |
| 2007/0175334 A1 | 8/2007 | Halliday et al. |
| 2007/0181005 A1 | 8/2007 | Kirschner et al. |
| 2007/0261564 A1 | 11/2007 | Suggi Liverani et al. |
| 2007/0289453 A1 | 12/2007 | Halliday et al. |
| 2007/0292584 A1 | 12/2007 | Arrick et al. |
| 2008/0026121 A1 | 1/2008 | Mastropasqua |
| 2008/0089982 A1 | 4/2008 | Brouwer et al. |
| 2008/0105130 A1 | 5/2008 | Koeling et al. |
| 2008/0148958 A1 | 6/2008 | Koeling et al. |
| 2008/0187638 A1 | 8/2008 | Hansen |
| 2008/0254169 A1 | 10/2008 | MacMahon et al. |
| 2008/0260928 A1 | 10/2008 | MacMahon et al. |
| 2008/0317931 A1 | 12/2008 | Mandralis et al. |
| 2009/0004335 A1 | 1/2009 | MacMahon et al. |
| 2009/0007796 A1 | 1/2009 | Ricotti |
| 2009/0017177 A1 | 1/2009 | Yoakim et al. |
| 2009/0022855 A1 | 1/2009 | Steenhof et al. |
| 2009/0022864 A1 | 1/2009 | Steenhof et al. |
| 2009/0035438 A1 | 2/2009 | Cortese |
| 2009/0047389 A1 | 2/2009 | Jarisch et al. |
| 2009/0104336 A1 | 4/2009 | Fraij et al. |
| 2009/0126577 A1 | 5/2009 | Ternite |
| 2009/0133584 A1 | 5/2009 | De Graaff et al. |
| 2009/0178571 A1 | 7/2009 | Brouwer et al. |
| 2009/0183640 A1 | 7/2009 | Ozanne |
| 2009/0211456 A1 | 8/2009 | De Graaff et al. |
| 2009/0211458 A1 | 8/2009 | Denisart et al. |
| 2009/0217823 A1 | 9/2009 | De Graaff et al. |
| 2009/0223373 A1 | 9/2009 | Kollep et al. |
| 2009/0232944 A1 | 9/2009 | MacMahon et al. |
| 2009/0235825 A1 | 9/2009 | De Graaff et al. |
| 2009/0263545 A1 | 10/2009 | Ozanne |
| 2009/0272274 A1 | 11/2009 | De Graaff et al. |
| 2009/0272275 A1 | 11/2009 | De Graaff et al. |
| 2009/0280219 A1 | 11/2009 | Yoakim et al. |
| 2009/0282987 A1 | 11/2009 | MacMahon et al. |
| 2009/0311384 A1 | 12/2009 | MacMahon et al. |
| 2009/0314167 A1 | 12/2009 | De Graaff et al. |
| 2009/0317518 A1 | 12/2009 | York et al. |
| 2009/0320692 A1 | 12/2009 | Simanski |
| 2009/0320693 A1 | 12/2009 | Ozanne |
| 2010/0000415 A1 | 1/2010 | Vanni |
| 2010/0003371 A1 | 1/2010 | Ozanne |
| 2010/0009039 A1 | 1/2010 | Robinson et al. |
| 2010/0015307 A1 | 1/2010 | Abegglen et al. |
| 2010/0028495 A1 | 2/2010 | Novak et al. |
| 2010/0034929 A1 | 2/2010 | Dogan et al. |
| 2010/0043644 A1 | 2/2010 | Suggi Liverani et al. |
| 2010/0043645 A1 | 2/2010 | Suggi Liverani et al. |
| 2010/0043646 A1 | 2/2010 | Suggi Liverani et al. |
| 2010/0077928 A1 | 4/2010 | Schmed et al. |
| 2010/0078446 A1 | 4/2010 | Halliday et al. |
| 2010/0119685 A1 | 5/2010 | van Bergen |
| 2010/0132564 A1 | 6/2010 | Ozanne et al. |
| 2010/0136183 A1 | 6/2010 | Gonus et al. |
| 2010/0147154 A1 | 6/2010 | De Graaff et al. |
| 2010/0147156 A1 | 6/2010 | Colantonio et al. |
| 2010/0147873 A1 | 6/2010 | Tanner et al. |
| 2010/0163440 A1 | 7/2010 | Tsang |
| 2010/0173055 A1 | 7/2010 | Brouwer et al. |
| 2010/0178391 A1 | 7/2010 | MacMahon et al. |
| 2010/0178392 A1 | 7/2010 | Yoakim et al. |
| 2010/0180774 A1 | 7/2010 | Kollep et al. |
| 2010/0180775 A1 | 7/2010 | Kollep et al. |
| 2010/0186599 A1 | 7/2010 | Yoakim et al. |
| 2010/0189844 A1 | 7/2010 | Brouwer et al. |
| 2010/0203198 A1 | 8/2010 | Yoakim et al. |
| 2010/0239717 A1 | 9/2010 | Yoakim et al. |
| 2010/0239733 A1 | 9/2010 | Yoakim et al. |
| 2010/0239734 A1 | 9/2010 | Yoakim et al. |
| 2010/0260895 A1 | 10/2010 | Yoakim et al. |
| 2010/0260896 A1 | 10/2010 | Yoakim et al. |
| 2010/0282091 A1 | 11/2010 | Doleac et al. |
| 2010/0297299 A1 | 11/2010 | Epars et al. |
| 2010/0303964 A1 | 12/2010 | Beaulieu et al. |
| 2010/0307930 A1 | 12/2010 | Zangerle |
| 2010/0313766 A1 | 12/2010 | Navarini et al. |
| 2010/0323068 A1 | 12/2010 | Gonus et al. |
| 2010/0326283 A1 | 12/2010 | Evers et al. |
| 2011/0003040 A1 | 1/2011 | Graf et al. |
| 2011/0005399 A1 | 1/2011 | Epars et al. |
| 2011/0011273 A1 | 1/2011 | Evers et al. |
| 2011/0020497 A1 | 1/2011 | Steven et al. |
| 2011/0020500 A1 | 1/2011 | Eichler et al. |
| 2011/0027425 A1 | 2/2011 | Heijdel et al. |
| 2011/0033580 A1 | 2/2011 | Biesheuvel et al. |
| 2011/0041702 A1 | 2/2011 | Yoakim et al. |
| 2011/0045144 A1 | 2/2011 | Boussemart et al. |
| 2011/0052761 A1 | 3/2011 | Yoakim et al. |
| 2011/0076361 A1 | 3/2011 | Peterson et al. |
| 2011/0079152 A1 | 4/2011 | Mariller |
| 2011/0113968 A1 | 5/2011 | Schmed et al. |
| 2011/0132199 A1 | 6/2011 | Vanni |
| 2011/0135802 A1 | 6/2011 | Robinson et al. |
| 2011/0135803 A1 | 6/2011 | Robinson et al. |
| 2011/0151075 A1 | 6/2011 | Peterson |
| 2011/0171350 A1 | 7/2011 | Remo |
| 2011/0183048 A1 | 7/2011 | Noble et al. |
| 2011/0185910 A1 | 8/2011 | Ryser |
| 2011/0186450 A1 | 8/2011 | Bonacci |
| 2011/0212225 A1 | 9/2011 | Mariller |
| 2011/0248037 A1 | 10/2011 | Fung |
| 2011/0262597 A1 | 10/2011 | Bennett et al. |
| 2011/0271844 A1 | 11/2011 | Mariller et al. |
| 2011/0283891 A1 | 11/2011 | Mariller |
| 2011/0297005 A1 | 12/2011 | Mariller |
| 2011/0305807 A1 | 12/2011 | Koeling et al. |
| 2012/0006205 A1 | 1/2012 | Vanni |
| 2012/0024160 A1 | 2/2012 | Van Os et al. |
| 2012/0031279 A1 | 2/2012 | Mariller et al. |
| 2012/0051672 A1 | 3/2012 | Foss et al. |
| 2012/0070542 A1 | 3/2012 | Camera et al. |
| 2012/0070544 A1 | 3/2012 | Van der Veen et al. |
| 2012/0121765 A1 | 5/2012 | Kamerbeek et al. |
| 2012/0148709 A1 | 6/2012 | Flamand et al. |
| 2012/0189740 A1 | 7/2012 | Ozanne et al. |
| 2012/0199010 A1 | 8/2012 | Mariller |
| 2012/0231123 A1 | 9/2012 | Kamerbeek et al. |
| 2012/0231124 A1 | 9/2012 | Kamerbeek et al. |
| 2012/0231133 A1 | 9/2012 | Kamerbeek et al. |
| 2012/0251668 A1 | 10/2012 | Wong et al. |
| 2012/0251669 A1 | 10/2012 | Kamerbeek et al. |
| 2012/0251670 A1 | 10/2012 | Kamerbeek et al. |
| 2012/0251671 A1 | 10/2012 | Kamerbeek et al. |
| 2012/0251672 A1 | 10/2012 | Kamerbeek et al. |
| 2012/0251694 A1 | 10/2012 | Kamerbeek et al. |
| 2012/0258210 A1 | 10/2012 | Wong et al. |
| 2012/0258219 A1 | 10/2012 | Biesheuvel et al. |
| 2012/0258221 A1 | 10/2012 | Biesheuvel et al. |
| 2012/0263829 A1 | 10/2012 | Kamerbeek et al. |
| 2012/0263830 A1 | 10/2012 | Kamerbeek et al. |
| 2012/0263833 A1 | 10/2012 | Wong et al. |
| 2012/0267395 A1 | 10/2012 | Biewenga |
| 2012/0276252 A1 | 11/2012 | Bolinger et al. |
| 2012/0276264 A1 | 11/2012 | Rivera |
| 2012/0328740 A1 | 12/2012 | Nocera |
| 2013/0011521 A1 | 1/2013 | Weijers et al. |
| 2013/0040021 A1 | 2/2013 | Digiuni |
| 2013/0045308 A1 | 2/2013 | Gorbatenko |
| 2013/0095218 A1 | 4/2013 | De Graaff et al. |
| 2013/0230625 A1 | 9/2013 | Brouwer et al. |
| 2013/0295240 A1 | 11/2013 | Wong et al. |
| 2013/0312620 A1 | 11/2013 | Mariller |
| 2013/0319252 A1 | 12/2013 | Castelli et al. |
| 2013/0341478 A1 | 12/2013 | Mariller |
| 2014/0010926 A1 | 1/2014 | Digiuni |
| 2014/0065269 A1 | 3/2014 | Favre |
| 2014/0174300 A1 | 6/2014 | Husband et al. |
| 2014/0178538 A1 | 6/2014 | Husband et al. |

(56) References Cited

U.S. PATENT DOCUMENTS

| | | |
|---|---|---|
| 2014/0220189 A1 | 8/2014 | Giovanni |
| 2014/0220190 A1 | 8/2014 | Giovanni |
| 2014/0220205 A1 | 8/2014 | Kamerbeek et al. |
| 2014/0242309 A1 | 8/2014 | Foss et al. |
| 2014/0261002 A1 | 9/2014 | Fountain et al. |
| 2014/0272018 A1 | 9/2014 | Koller et al. |
| 2015/0110929 A1 | 4/2015 | Camera et al. |
| 2015/0259134 A1 | 9/2015 | Mack et al. |

FOREIGN PATENT DOCUMENTS

| | | |
|---|---|---|
| CA | 2400033 A1 | 8/2001 |
| CA | 2366837 A1 | 7/2002 |
| CA | 2349507 A1 | 12/2002 |
| CA | 2780774 A1 | 1/2003 |
| CA | 2108753 C | 5/2004 |
| CA | 2513719 A1 | 8/2004 |
| CA | 2513723 A1 | 8/2004 |
| CA | 2513765 C | 8/2004 |
| CA | 2513995 A1 | 8/2004 |
| CA | 2514072 A1 | 8/2004 |
| CA | 2514144 C | 8/2004 |
| CA | 2547583 A1 | 6/2005 |
| CA | 2555089 A1 | 9/2005 |
| CA | 2555329 A1 | 9/2005 |
| CA | 2555775 A1 | 9/2005 |
| CA | 2556421 A1 | 9/2005 |
| CA | 2560841 A1 | 10/2005 |
| CA | 2560846 A1 | 10/2005 |
| CA | 2399290 A1 | 1/2006 |
| CA | 2574961 A1 | 2/2006 |
| CA | 2581630 A1 | 4/2006 |
| CA | 2586422 A1 | 5/2006 |
| CA | 2448474 C | 12/2006 |
| CA | 2622933 A1 | 4/2007 |
| CA | 2650388 A1 | 11/2007 |
| CA | 2651921 A1 | 11/2007 |
| CA | 2656878 A1 | 1/2008 |
| CA | 2657846 A1 | 1/2008 |
| CA | 2660119 A1 | 2/2008 |
| CA | 2661921 A1 | 3/2008 |
| CA | 2629268 A1 | 10/2008 |
| CA | 2684669 A1 | 11/2008 |
| CA | 2686347 A1 | 12/2008 |
| CA | 2701826 A1 | 1/2009 |
| CA | 2517624 C | 4/2009 |
| CA | 2643479 A1 | 5/2009 |
| CA | 2713149 A1 | 9/2009 |
| CA | 2697823 A1 | 9/2010 |
| CA | 2496416 C | 10/2010 |
| CA | 2764942 A1 | 12/2010 |
| CA | 2764946 A1 | 12/2010 |
| CA | 2764949 A1 | 12/2010 |
| CA | 2765131 A1 | 12/2010 |
| CA | 2765132 A1 | 12/2010 |
| CA | 2765134 A1 | 12/2010 |
| CA | 2765136 A1 | 12/2010 |
| CA | 2765320 A1 | 12/2010 |
| CA | 2765322 A1 | 12/2010 |
| CA | 2765323 A1 | 12/2010 |
| CA | 2765324 A1 | 12/2010 |
| CA | 2765325 A1 | 12/2010 |
| CA | 2765383 A1 | 12/2010 |
| CA | 2765388 A1 | 12/2010 |
| CA | 2765456 A1 | 12/2010 |
| CA | 2765468 A1 | 12/2010 |
| CA | 2521063 C | 5/2011 |
| CA | 2662071 C | 7/2011 |
| CA | 2538256 C | 8/2011 |
| CA | 2531544 C | 5/2012 |
| CA | 2662069 C | 1/2013 |
| CL | 40542 | 6/2000 |
| CL | 0634-2000 | 1/2001 |
| CL | 1136-2011 | 10/2011 |
| DE | 3140244 | 4/1983 |
| DE | 3501786 | 7/1986 |
| DE | 102004056224 | 5/2006 |
| DE | 102005016297 | 10/2006 |
| DE | 202006013189 | 11/2006 |
| DE | 202004021229 U1 | 5/2007 |
| DE | 102005058336 A1 | 6/2007 |
| DE | 602004007479 | 4/2008 |
| EP | 57671 A2 | 8/1982 |
| EP | 114717 A2 | 8/1984 |
| EP | 188299 A1 | 7/1986 |
| EP | 224297 A1 | 6/1987 |
| EP | 272922 A2 | 6/1988 |
| EP | 309708 A1 | 4/1989 |
| EP | 337615 A1 | 10/1989 |
| EP | 389141 A1 | 9/1990 |
| EP | 493856 A2 | 12/1990 |
| EP | 449533 A1 | 10/1991 |
| EP | 451980 A2 | 10/1991 |
| EP | 455337 A1 | 11/1991 |
| EP | 468079 A1 | 1/1992 |
| EP | 471094 A1 | 2/1992 |
| EP | 512148 A1 | 11/1992 |
| EP | 512468 A1 | 11/1992 |
| EP | 521510 A1 | 1/1993 |
| EP | 524464 A1 | 1/1993 |
| EP | 0377849 B1 | 4/1993 |
| EP | 554469 A1 | 8/1993 |
| EP | 638486 A1 | 8/1994 |
| EP | 615921 A1 | 9/1994 |
| EP | 0584314 B1 | 7/1996 |
| EP | 761148 B1 | 3/1997 |
| EP | 806373 A1 | 11/1997 |
| EP | 821906 A1 | 2/1998 |
| EP | 844195 A1 | 5/1998 |
| EP | 860375 A1 | 8/1998 |
| EP | 904717 A1 | 3/1999 |
| EP | 1042978 A1 | 10/2000 |
| EP | 1166697 A2 | 1/2002 |
| EP | 1167204 A1 | 1/2002 |
| EP | 1188400 A1 | 3/2002 |
| EP | 1190959 A1 | 3/2002 |
| EP | 1243210 A1 | 9/2002 |
| EP | 1247756 A1 | 10/2002 |
| EP | 1273528 A1 | 1/2003 |
| EP | 1221418 B1 | 5/2003 |
| EP | 1369356 A1 | 12/2003 |
| EP | 1440636 A1 | 7/2004 |
| EP | 1440903 A1 | 7/2004 |
| EP | 1440904 A1 | 7/2004 |
| EP | 1440905 A1 | 7/2004 |
| EP | 1440906 B1 | 7/2004 |
| EP | 1440907 A2 | 7/2004 |
| EP | 1440908 A2 | 7/2004 |
| EP | 1440909 A1 | 7/2004 |
| EP | 1440911 A1 | 7/2004 |
| EP | 1440912 A1 | 7/2004 |
| EP | 1440913 A1 | 7/2004 |
| EP | 1440914 A1 | 7/2004 |
| EP | 1462042 A1 | 9/2004 |
| EP | 1529739 A1 | 5/2005 |
| EP | 1398279 B1 | 6/2005 |
| EP | 1574452 A2 | 9/2005 |
| EP | 1579791 A1 | 9/2005 |
| EP | 1579792 A1 | 9/2005 |
| EP | 1579793 A1 | 9/2005 |
| EP | 1580143 A1 | 9/2005 |
| EP | 1580144 A1 | 9/2005 |
| EP | 1604915 A1 | 12/2005 |
| EP | 1631151 A1 | 3/2006 |
| EP | 1654966 A1 | 5/2006 |
| EP | 1440910 B1 | 6/2006 |
| EP | 1676786 A2 | 7/2006 |
| EP | 1631151 B1 | 9/2006 |
| EP | 1700548 A1 | 9/2006 |
| EP | 1702543 A2 | 9/2006 |
| EP | 1710173 A1 | 10/2006 |
| EP | 1599395 B1 | 1/2007 |
| EP | 1608569 B1 | 1/2007 |
| EP | 1767467 A1 | 3/2007 |

(56) References Cited

FOREIGN PATENT DOCUMENTS

| | | |
|---|---|---|
| EP | 1775234 B1 | 4/2007 |
| EP | 1418135 B1 | 5/2007 |
| EP | 1785369 A1 | 5/2007 |
| EP | 1646304 B1 | 7/2007 |
| EP | 1808382 B1 | 7/2007 |
| EP | 1815750 B1 | 8/2007 |
| EP | 1826148 B1 | 8/2007 |
| EP | 1839543 B1 | 10/2007 |
| EP | 1847481 A3 | 10/2007 |
| EP | 1849715 B1 | 10/2007 |
| EP | 1864917 B1 | 12/2007 |
| EP | 1886942 B1 | 2/2008 |
| EP | 1547499 B1 | 3/2008 |
| EP | 1894850 A1 | 3/2008 |
| EP | 1894853 B1 | 3/2008 |
| EP | 1894854 B1 | 3/2008 |
| EP | 1908706 A3 | 4/2008 |
| EP | 1716069 B1 | 5/2008 |
| EP | 1929904 A1 | 6/2008 |
| EP | 1775234 B1 | 7/2008 |
| EP | 1974638 A1 | 10/2008 |
| EP | 1975087 A3 | 10/2008 |
| EP | 1977651 A1 | 10/2008 |
| EP | 1980155 A1 | 10/2008 |
| EP | 1982933 B1 | 10/2008 |
| EP | 1985213 B1 | 10/2008 |
| EP | 1792850 B1 | 11/2008 |
| EP | 1997748 A1 | 12/2008 |
| EP | 1883587 B1 | 5/2009 |
| EP | 1894850 B1 | 5/2009 |
| EP | 2058243 B1 | 5/2009 |
| EP | 2062831 A3 | 5/2009 |
| EP | 2070454 B1 | 6/2009 |
| EP | 2093164 B1 | 8/2009 |
| EP | 2095716 B1 | 9/2009 |
| EP | 2098144 B1 | 9/2009 |
| EP | 2100824 B1 | 9/2009 |
| EP | 1894854 B1 | 11/2009 |
| EP | 2119640 B1 | 11/2009 |
| EP | 1892199 B1 | 12/2009 |
| EP | 2141093 A1 | 1/2010 |
| EP | 2151313 B1 | 2/2010 |
| EP | 2165937 A1 | 3/2010 |
| EP | 2168469 B1 | 3/2010 |
| EP | 2134611 B1 | 6/2010 |
| EP | 1983871 B1 | 7/2010 |
| EP | 2210540 A1 | 7/2010 |
| EP | 2210826 B1 | 7/2010 |
| EP | 2210827 B1 | 7/2010 |
| EP | 1811880 B1 | 8/2010 |
| EP | 2037782 B1 | 8/2010 |
| EP | 2228320 A1 | 9/2010 |
| EP | 2230195 A1 | 9/2010 |
| EP | 2233051 A1 | 9/2010 |
| EP | 2236060 A1 | 10/2010 |
| EP | 2236437 B1 | 10/2010 |
| EP | 2239211 A1 | 10/2010 |
| EP | 2239212 A1 | 10/2010 |
| EP | 2263501 A1 | 12/2010 |
| EP | 2279845 A3 | 2/2011 |
| EP | 2284100 B1 | 2/2011 |
| EP | 2284101 B1 | 2/2011 |
| EP | 2284102 B1 | 2/2011 |
| EP | 2287090 B1 | 2/2011 |
| EP | 2139792 B1 | 3/2011 |
| EP | 2289820 B1 | 3/2011 |
| EP | 2298667 A1 | 3/2011 |
| EP | 2308776 B1 | 4/2011 |
| EP | 2155586 B1 | 7/2011 |
| EP | 2343247 B1 | 7/2011 |
| EP | 2345351 A1 | 7/2011 |
| EP | 2345602 B1 | 7/2011 |
| EP | 2303077 B1 | 8/2011 |
| EP | 2364930 A2 | 9/2011 |
| EP | 2387922 A1 | 11/2011 |
| EP | 2234522 B1 | 12/2011 |
| EP | 1648274 B1 | 2/2012 |
| EP | 2465792 A2 | 6/2012 |
| EP | 2306871 B1 | 7/2012 |
| EP | 2166903 B1 | 8/2012 |
| EP | 2484605 A1 | 8/2012 |
| EP | 2367741 B1 | 9/2012 |
| EP | 2510802 A2 | 10/2012 |
| EP | 2510803 A2 | 10/2012 |
| EP | 2510804 A2 | 10/2012 |
| EP | 2510805 A2 | 10/2012 |
| EP | 2510843 A1 | 10/2012 |
| EP | 1894853 B1 | 11/2012 |
| EP | 2442699 B1 | 4/2013 |
| EP | 2367736 B1 | 5/2013 |
| EP | 2426065 B1 | 5/2013 |
| GB | 1376074 | 12/1974 |
| IT | 1210982 | 9/1989 |
| IT | 1256690 | 3/1992 |
| IT | 1307241 | 4/1999 |
| IT | MI032423 | 6/2005 |
| IT | MI061503 | 1/2008 |
| IT | TO090216 | 3/2009 |
| IT | TO080631 | 2/2010 |
| NL | 8500029 A | 8/1986 |
| NL | 8503092 A | 6/1987 |
| NL | 8600958 A | 11/1987 |
| NL | 9002815 A | 7/1992 |
| NL | 9400837 A | 1/1996 |
| NL | 1001120 C2 | 3/1997 |
| NL | 1002929 C2 | 10/1997 |
| NL | 1003716 C2 | 2/1998 |
| NL | 1005328 C2 | 8/1998 |
| NL | 1007171 C2 | 3/1999 |
| NL | 1019013 C2 | 3/2003 |
| NL | 1020835 C2 | 12/2003 |
| NL | 1021325 C2 | 2/2004 |
| NL | 1024012 C2 | 2/2005 |
| NL | 1024160 C2 | 2/2005 |
| NL | 1026068 C2 | 10/2005 |
| NL | 1026437 C2 | 12/2005 |
| NL | 1026834 C2 | 2/2006 |
| NL | 1029155 C2 | 4/2006 |
| NL | 1028101 C2 | 7/2006 |
| NL | 1029503 C2 | 1/2007 |
| NL | 1032292 C2 | 5/2007 |
| NL | 1031622 C2 | 10/2007 |
| NL | 1032080 C2 | 10/2007 |
| NL | 1032081 C2 | 10/2007 |
| NL | 1032082 C2 | 10/2007 |
| NL | 1032085 C2 | 10/2007 |
| NL | 1032087 C2 | 10/2007 |
| NL | 1032090 C2 | 10/2007 |
| NL | 1032091 C2 | 10/2007 |
| NL | 1033968 C2 | 12/2008 |
| NL | 2001539 C2 | 10/2009 |
| WO | WO 1992/007775 A1 | 5/1992 |
| WO | WO 1993/017932 A1 | 9/1993 |
| WO | WO 2000/051478 A1 | 9/2000 |
| WO | WO 2000/056629 A1 | 9/2000 |
| WO | WO 2001/058786 A1 | 8/2001 |
| WO | WO 2001/060219 A1 | 8/2001 |
| WO | WO 2001/060220 A1 | 8/2001 |
| WO | WO 2001/060712 A1 | 8/2001 |
| WO | WO 2002/058522 A2 | 8/2002 |
| WO | WO 2002/080744 A1 | 10/2002 |
| WO | WO 2002/081327 A2 | 10/2002 |
| WO | WO 2002/082963 A1 | 10/2002 |
| WO | WO 2003/059778 A3 | 7/2003 |
| WO | WO 2003/073896 A1 | 9/2003 |
| WO | WO 2004/005136 A1 | 1/2004 |
| WO | WO 2004/018326 A1 | 3/2004 |
| WO | WO 2004/026091 A1 | 4/2004 |
| WO | WO 2004/064584 A1 | 8/2004 |
| WO | WO 2004/065225 A3 | 8/2004 |
| WO | WO 2004/065256 A1 | 8/2004 |
| WO | WO 2004/065257 A1 | 8/2004 |
| WO | WO 2004/065258 A2 | 8/2004 |
| WO | WO 2004/065259 A1 | 8/2004 |

(56) References Cited

FOREIGN PATENT DOCUMENTS

| | | |
|---|---|---|
| WO | WO 2004/083071 A1 | 9/2004 |
| WO | WO 2004/084687 A1 | 10/2004 |
| WO | WO 2005/009865 A1 | 2/2005 |
| WO | WO 2005/018394 A1 | 3/2005 |
| WO | WO 2005/026018 A1 | 3/2005 |
| WO | WO 2005/054080 A1 | 6/2005 |
| WO | WO 2005/056423 A1 | 6/2005 |
| WO | WO 2005/066040 A2 | 7/2005 |
| WO | WO 2005/079637 A1 | 9/2005 |
| WO | WO 2005/079638 A1 | 9/2005 |
| WO | WO 2005/079639 A2 | 9/2005 |
| WO | WO 2005/080222 A1 | 9/2005 |
| WO | WO 2005/092160 A1 | 10/2005 |
| WO | WO 2005/092162 A1 | 10/2005 |
| WO | WO 2005/105609 A2 | 11/2005 |
| WO | WO 2005/122780 A1 | 12/2005 |
| WO | WO 2005/122851 A1 | 12/2005 |
| WO | WO 2006/008243 A1 | 1/2006 |
| WO | WO 2006/014936 A2 | 2/2006 |
| WO | WO 2006/016813 A2 | 2/2006 |
| WO | WO 2006/021405 A2 | 3/2006 |
| WO | WO 2006/037062 A1 | 4/2006 |
| WO | WO 2006/043096 A1 | 4/2006 |
| WO | WO 2006/043098 A1 | 4/2006 |
| WO | WO 2006/043102 A1 | 4/2006 |
| WO | WO 2006/043103 A1 | 4/2006 |
| WO | WO 2006/043104 A2 | 4/2006 |
| WO | WO 2006/043106 A2 | 4/2006 |
| WO | WO 2006/043108 A1 | 4/2006 |
| WO | WO 2006/043109 A1 | 4/2006 |
| WO | WO 2006/045536 A1 | 5/2006 |
| WO | WO 2006/045537 A1 | 5/2006 |
| WO | WO 2006/057022 A1 | 6/2006 |
| WO | WO 2006/043109 A1 | 7/2006 |
| WO | WO 2007/008067 A1 | 1/2007 |
| WO | WO 2007/025773 A2 | 3/2007 |
| WO | WO 2007/039032 A2 | 4/2007 |
| WO | WO 2007/042414 A1 | 4/2007 |
| WO | WO 2007/054479 A1 | 5/2007 |
| WO | WO 2007/056097 A2 | 5/2007 |
| WO | WO 2007/096196 A2 | 8/2007 |
| WO | WO 2007/113100 A2 | 10/2007 |
| WO | WO 2007/120045 A2 | 10/2007 |
| WO | WO 2007/120046 A2 | 10/2007 |
| WO | WO 2007/120047 A2 | 10/2007 |
| WO | WO 2007/120048 A2 | 10/2007 |
| WO | WO 2007/120049 A2 | 10/2007 |
| WO | WO 2007/120050 A2 | 10/2007 |
| WO | WO 2007/120051 A2 | 10/2007 |
| WO | WO 2007/120052 A2 | 10/2007 |
| WO | WO 2007/122206 A1 | 11/2007 |
| WO | WO 2007/122208 A1 | 11/2007 |
| WO | WO 2007/125337 A1 | 11/2007 |
| WO | WO 2007/131559 A1 | 11/2007 |
| WO | WO 2007/137974 A2 | 12/2007 |
| WO | WO 2007/141202 A1 | 12/2007 |
| WO | WO 2008/011913 A1 | 1/2008 |
| WO | WO 2008/018794 A2 | 2/2008 |
| WO | WO 2008/025715 A1 | 3/2008 |
| WO | WO 2008/025730 A1 | 3/2008 |
| WO | WO 2008/025785 A2 | 3/2008 |
| WO | WO 2008/087553 A1 | 7/2008 |
| WO | WO 2008/090122 A2 | 7/2008 |
| WO | WO 2008/113779 A2 | 9/2008 |
| WO | WO 2008/116818 A1 | 10/2008 |
| WO | WO 2008/123775 A1 | 10/2008 |
| WO | WO 2008/126045 A1 | 10/2008 |
| WO | WO 2008/129053 A1 | 10/2008 |
| WO | WO 2008/132571 A1 | 11/2008 |
| WO | WO 2008/144462 A1 | 11/2008 |
| WO | WO 2008/148604 A1 | 12/2008 |
| WO | WO 2008/148650 A1 | 12/2008 |
| WO | WO 2008/148834 A1 | 12/2008 |
| WO | WO 2008/153383 A1 | 12/2008 |
| WO | WO 2009/053811 A2 | 4/2009 |
| WO | WO 2009/092628 A1 | 7/2009 |
| WO | WO 2009/092629 A1 | 7/2009 |
| WO | WO 2009/110783 A2 | 9/2009 |
| WO | WO 2009/112291 A1 | 9/2009 |
| WO | WO 2009/114119 A1 | 9/2009 |
| WO | WO 2009/115475 A1 | 9/2009 |
| WO | WO 2009/128016 A1 | 10/2009 |
| WO | WO 2009/133134 A1 | 11/2009 |
| WO | WO 2010/006936 A1 | 1/2010 |
| WO | WO 2010/009975 A2 | 1/2010 |
| WO | WO 2010/014201 A | 2/2010 |
| WO | WO 2010/016753 A1 | 2/2010 |
| WO | WO 2010/018540 A2 | 2/2010 |
| WO | WO 2010/033023 A2 | 3/2010 |
| WO | WO 2010/038213 A2 | 4/2010 |
| WO | WO 2010/041179 A2 | 4/2010 |
| WO | WO 2010/055465 A1 | 5/2010 |
| WO | WO 2010/066705 A1 | 6/2010 |
| WO | WO 2010/066736 A1 | 6/2010 |
| WO | WO 2010/076048 A1 | 7/2010 |
| WO | WO 2010/076698 A1 | 7/2010 |
| WO | WO 2010/079454 A1 | 7/2010 |
| WO | WO 2010/084475 A2 | 7/2010 |
| WO | WO 2010/092543 A2 | 8/2010 |
| WO | WO 2010/095937 A1 | 8/2010 |
| WO | WO 2010/106516 A1 | 9/2010 |
| WO | WO 2010/112353 A1 | 10/2010 |
| WO | WO 2010/116284 A2 | 10/2010 |
| WO | WO 2010/126365 A1 | 11/2010 |
| WO | WO 2010/128028 A1 | 11/2010 |
| WO | WO 2010/128031 A1 | 11/2010 |
| WO | WO 2010/128051 A1 | 11/2010 |
| WO | WO 2010/128844 A1 | 11/2010 |
| WO | WO 2010/134036 A1 | 11/2010 |
| WO | WO 2010/137945 A1 | 12/2010 |
| WO | WO 2010/137946 A1 | 12/2010 |
| WO | WO 2010/137947 A1 | 12/2010 |
| WO | WO 2010/137948 A1 | 12/2010 |
| WO | WO 2010/137949 A1 | 12/2010 |
| WO | WO 2010/137950 A1 | 12/2010 |
| WO | WO 2010/137951 A1 | 12/2010 |
| WO | WO 2010/137952 A1 | 12/2010 |
| WO | WO 2010/137953 A1 | 12/2010 |
| WO | WO 2010/137954 A1 | 12/2010 |
| WO | WO 2010/137955 A1 | 12/2010 |
| WO | WO 2010/137956 A1 | 12/2010 |
| WO | WO 2010/137957 A1 | 12/2010 |
| WO | WO 2010/137958 A1 | 12/2010 |
| WO | WO 2010/137959 A1 | 12/2010 |
| WO | WO 2010/137960 A1 | 12/2010 |
| WO | WO 2010/137961 A1 | 12/2010 |
| WO | WO 2010/137962 A1 | 12/2010 |
| WO | WO 2010/137963 A1 | 12/2010 |
| WO | WO 2010/137965 A1 | 12/2010 |
| WO | WO 2010/137966 A1 | 12/2010 |
| WO | WO 2010/138563 A1 | 12/2010 |
| WO | WO 2010/146101 A1 | 12/2010 |
| WO | WO 2011/000723 A2 | 1/2011 |
| WO | WO 2011/000725 A1 | 1/2011 |
| WO | WO 2011/015973 A1 | 2/2011 |
| WO | WO 2011/027259 A1 | 3/2011 |
| WO | WO 2011/029873 A1 | 3/2011 |
| WO | WO 2011/031294 A2 | 3/2011 |
| WO | WO 2011/037464 A1 | 3/2011 |
| WO | WO 2011/042489 A1 | 4/2011 |
| WO | WO 2011/048377 A1 | 4/2011 |
| WO | WO 2011/061126 A1 | 5/2011 |
| WO | WO 2011/069830 A1 | 6/2011 |
| WO | WO 2011/075638 A1 | 6/2011 |
| WO | WO 2011/089048 A1 | 7/2011 |
| WO | WO 2011/092301 A1 | 8/2011 |
| WO | WO 2011/117768 A1 | 9/2011 |
| WO | WO 2012/004878 A1 | 1/2012 |
| WO | WO 2012/077066 A1 | 6/2012 |
| WO | WO 2012/080908 A1 | 6/2012 |
| WO | WO 2012/104768 A1 | 8/2012 |
| WO | WO 2012/120459 A1 | 9/2012 |
| WO | WO 2012/122329 A1 | 9/2012 |
| WO | WO 2012/127233 A2 | 9/2012 |

(56) References Cited

FOREIGN PATENT DOCUMENTS

| WO | WO 2012/150542 A1 | 11/2012 |
|---|---|---|
| WO | WO 2012/164521 A1 | 12/2012 |
| WO | WO 2013/043048 A1 | 3/2013 |
| WO | WO 2013/066178 A1 | 5/2013 |
| WO | WO 2013/080073 A1 | 6/2013 |
| WO | WO 2013/122460 A1 | 8/2013 |
| WO | WO 2013/124234 A1 | 8/2013 |
| WO | WO 2013/153473 A1 | 10/2013 |
| WO | WO 2013/153526 A1 | 10/2013 |
| WO | WO 2013/168083 A1 | 11/2013 |
| WO | WO 2013/183023 A1 | 12/2013 |
| WO | WO 2014/006527 A2 | 1/2014 |
| WO | WO 2014/007639 A1 | 1/2014 |
| WO | WO 2014/037842 A1 | 3/2014 |
| WO | WO 2014/126463 A1 | 8/2014 |
| WO | WO 2014/126464 A2 | 8/2014 |
| WO | WO 2014/158656 A1 | 10/2014 |

OTHER PUBLICATIONS

Australian Office Action in corresponding AU Application No. 2011201950, dated Sep. 30, 2014, 6 pages.
Chilean Office Action in corresponding CL Application No. 2013-000698, dated Mar. 14, 2013, 11 pages.
Chinese Office Action in corresponding CN Application No. 201180051209.5, dated Jun. 5, 2014, 12 pages.
Colombian Office Action in corresponding CO Application No. 13-082099, dated , 12 pages.
González, et al.: "HPLC analysis oftocopherols and triglycerides in coffee and their use and authentication parameters," Food Chemistry, Apr. 2001, pp. 93-101, vol. 73, issue 1.
Gulf Coopeartion Counsel Office Action in corresponding Application No. GC 2011-19277, dated Aug. 17, 2011, 11 pages.
International Search Report in corresponding International Application No. PCT/US2011/051842, dated Feb. 27, 2012, 6 pages.
International Written Opinion, re PCT App. No. PCT/US2011/051842, dated Oct. 17, 2012, 6 pages.
International Preliminary Report on Patentability in corresponding International Application No. PCT/US2011/051842, dated Jan. 17, 2013.
European Extended Search Report, re EP Application No. 13005095.8, dated Nov. 20, 2013, 7 pages.
New Zealand First Exam Report, re NZ Application No. 609426, dated Sep. 17, 2013, 2 pages.
U.S. Office Action in corresponding U.S. Appl. No. 13/232,749, dated Apr. 25, 2013, 55 pages.
International Invitation to Pay Additional Fees, in corresponding Application No. PCT/US16/12159, dated Mar. 16, 2016, in 3 pages.
Artisan Sugars, Coffee and Tea Sugars—Cappuccino cup & saucers. www.artisansurgars.com Copyright 2015.
PCT Search Report and Written opinion dated May 30, 2016, issued in corresponding PCT Application No. PCT/US2016/012159.

METHOD OF MAKING A SWEETENED SOLUBLE BEVERAGE PRODUCT

FIELD

The present disclosure relates to a soluble beverage component and a sealed cartridge containing a single serving of a soluble beverage component for producing a beverage when fluid is introduced into the cartridge. The cartridge can be configured for use with single-serve beverage machines.

BACKGROUND

Many beverages have a distinct taste and aroma that is difficult to duplicate in a more convenient form. One example of such a beverage is coffee. With regular coffee, water is boiled in a coffee pot in advance, and ground roasted coffee beans are put directly in contact with boiling water (the standard amount is 10 g of ground roasted coffee beans per 100 ml of boiling water) and are boiled in boiling water to effect extraction or are similarly extracted by using a percolator or the like. The obtained extract contains caffeine, tannic acid, saccharides, fats, proteins and various aromatic components and it has a fragrance inherent to coffee and a peculiar complicated flavor inclusive of a bitter taste, an astringent taste and an acid taste.

Attempts have been made to place soluble beverages such as soluble coffee in cartridges for use in single-serve beverage machines. However, dry soluble coffee creates dust when transported from one container to another. When soluble coffee is introduced into a single-serve cartridge, so much dusting occurs that often the cartridges cannot be sealed correctly. Further, dry soluble coffee material is generally too free flowing to allow efficient commercial processing and packing into self-serve cartridges. Soluble coffee in self-serve cartridges can also dissolve very quickly in water, which can clog the cartridge or self-serve machine and prevent the production of a uniform beverage product.

Many aromas and flavors associated with coffee are very delicate and complex. With conventional soluble coffee, the delicate coffee flavors and aromas are often degraded or lost during processing and manufacturing methods. Coffee aroma is known to be very unstable. As coffee aroma degrades, it generates unpleasant and non-coffee-like notes that are undesirable. This degradation substantially reduces the perceived quality of the product. For this reason, special attention must be paid to the preparation and storage of flavoring components such as coffee aroma so that desirable aroma components are enhanced or undesirable components are reduced or eliminated.

SUMMARY OF THE DISCLOSURE

Some embodiments relate to a method of making a sweetened soluble beverage component, the method comprising combining a soluble beverage, a sweetener and coffee beans in a vessel to form a mixture; agitating the mixture for a predetermined amount of time; and removing the coffee beans from the mixture, wherein the sweetened soluble beverage component comprises the soluble beverage and the sweetener.

In some embodiments, the sweetener is sugar.
In some embodiments, the sweetener is granular sugar.
In some embodiments, the soluble beverage is soluble coffee.
In some embodiments, the soluble coffee contains pulverized coffee beans.

In some embodiments, the coffee beans are roasted whole coffee beans.

In some embodiments, the roasted whole coffee beans are roasted whole espresso beans.

In some embodiments, agitating the mixture comprises at least one of mixing, blending, tumbling and panning.

In some embodiments, removing the coffee beans from the mixture comprises filtering the mixture.

Some embodiments relate to adding to the mixture at least one of a dairy component, a spice, a cocoa, a fruit powder and a flavoring component.

Some embodiments relate to placing the sweetened soluble beverage component into a self-serve cartridge.

Some embodiments relate to a cartridge for producing a single serving of a beverage, the cartridge comprising: a cup comprising a lid, a bottom wall and a sidewall extending between the lid and the bottom wall; and a single serving of a sweetened soluble beverage component disposed in the cartridge, wherein the sweetened soluble beverage component comprises a soluble beverage, a sweetener and oil from coffee beans, wherein the oil from coffee beans was imparted to the soluble beverage and sweetener by mixing them with the coffee beans which were removed after mixing.

In some embodiments, the sweetener is sugar.
In some embodiments, the coffee beans were removed from the sweetened soluble beverage component by filtering.

Some embodiments relate to a sweetened soluble beverage component comprising a soluble beverage, a sweetener and oil from coffee beans, wherein the oil from coffee beans was imparted to the soluble beverage and sweetener by mixing them with the coffee beans which were removed after mixing.

In some embodiments, the sweetener is sugar.
In some embodiments, the soluble beverage is soluble coffee.
In some embodiments, the coffee beans are roasted whole coffee beans.

BRIEF DESCRIPTION OF THE FIGURES

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
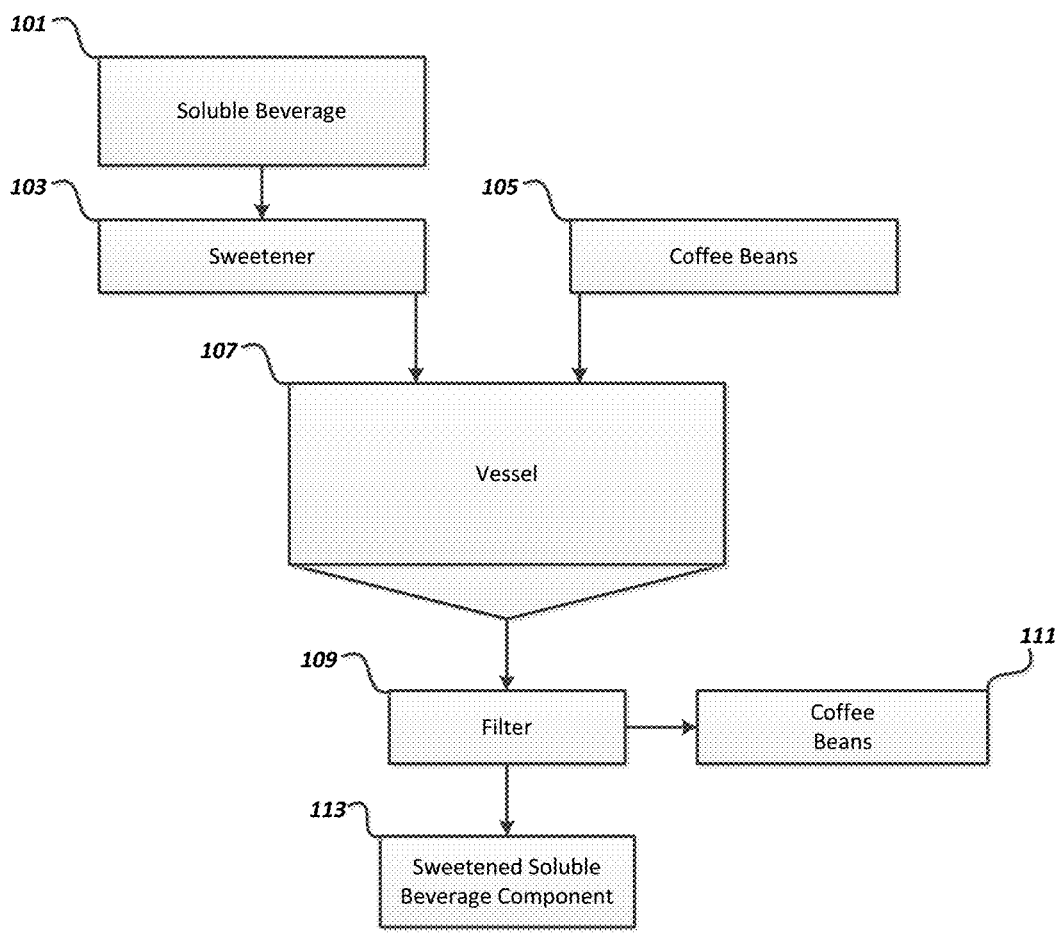
FIG. 1 is a process flow diagram illustrating an overview of one embodiment of a method of making a sweetened soluble beverage component.

The following discussion is presented to enable a person skilled in the art to make and use one or more of the present embodiments. The general principles described herein may be applied to embodiments and applications other than those detailed below without departing from the spirit and scope of the disclosure. Indeed, the present embodiments are not intended to be limited to the particular embodiments shown, but are to be accorded the widest scope consistent with the principles and features disclosed or suggested herein.

Language of degree used herein, such as the terms "approximately," "about," "generally," and "substantially" as used herein represent a value, amount or characteristic close to the stated value, amount or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15°, 10°, 5°, 3°, 1°, 0.1°, or otherwise. Similarly, in certain embodiments, the terms "generally perpendicular" and "substantially perpendicular" refer to a value, amount, or characteristic that departs from exactly perpendicular by less than or equal to 15°, 10°, 5°, 3°, 1°, 0.1°, or otherwise.

Some embodiments of the present disclosure are directed to soluble beverage components and methods of making soluble beverage components with improved features such as, taste and aroma. Soluble or "instant" beverages, especially in single-serve cartridges allow for an efficient and simple way for a consumer to prepare a beverage at home or other setting. Maintaining the flavors and aromas of the original beverage in the soluble form of the beverage presents unique challenges. For example, the introduction of dry soluble coffee into a self-serve cartridge may cause an unacceptable amount of dusting, which prevents the cartridge from being effectively sealed. Further, such soluble coffee inside a cartridge may dissolve quickly and unevenly when water is introduced by a self-serve machine. This can result in clogging of the cartridge or the machine and the production of an uneven beverage product.

In some embodiments of the present disclosure, soluble beverage powder is mixed with sweetener and roasted whole coffee beans. The resulting sweetened soluble beverage component has enhanced flavors and aromas, significantly lower amounts of dusting and can be efficiently placed in a self-serve cartridge which can then be properly sealed. While not wishing to be bound by any particular theory, it is postulated that the sweetener, when mixed with the whole coffee beans, removes oil from the coffee beans, a portion of which is then transferred to the soluble coffee. The resulting mixture is easier to handle and can be transferred and packaged efficiently. Also, the oil from the whole coffee beans may impart higher caffeine content and additional flavor notes and aromas to the soluble beverage, giving it a flavor and aroma more like that of fresh brewed coffee. The oil from the whole coffee beans may also reduce the solubility of the soluble beverage, thereby allowing it to dissolve in a more controlled and uniform manner when mixed with liquid. Therefore, the sweetened soluble beverage component can be used in self-serve beverage cartridges and machines.

FIGS. 1-4 discussed below illustrate example embodiments in which particular combinations and variables are used. However, the following are in no way meant to limit the scope of the present embodiments which cover modifications and equivalent arrangements included within the spirit and scope of the appended claims. It should be understood that the particulars disclosed below are for illustrative purposes and may vary without departing from the scope of the present disclosure. Each example embodiment will be addressed in turn below with reference to the accompanying figures.

One example embodiment of the process for preparing such a sweetened soluble beverage component is shown in FIG. 1. Referring to FIG. 1, in accordance with an example embodiment, a soluble beverage 101 is combined with a sweetener 103 and coffee beans 105. The resulting mixture is then agitated for an amount of time in a vessel 107. The mixture is then subjected to a filter 109 to remove the coffee beans 111. The resulting sweetened soluble beverage component 113 is retained.

Figure 2:
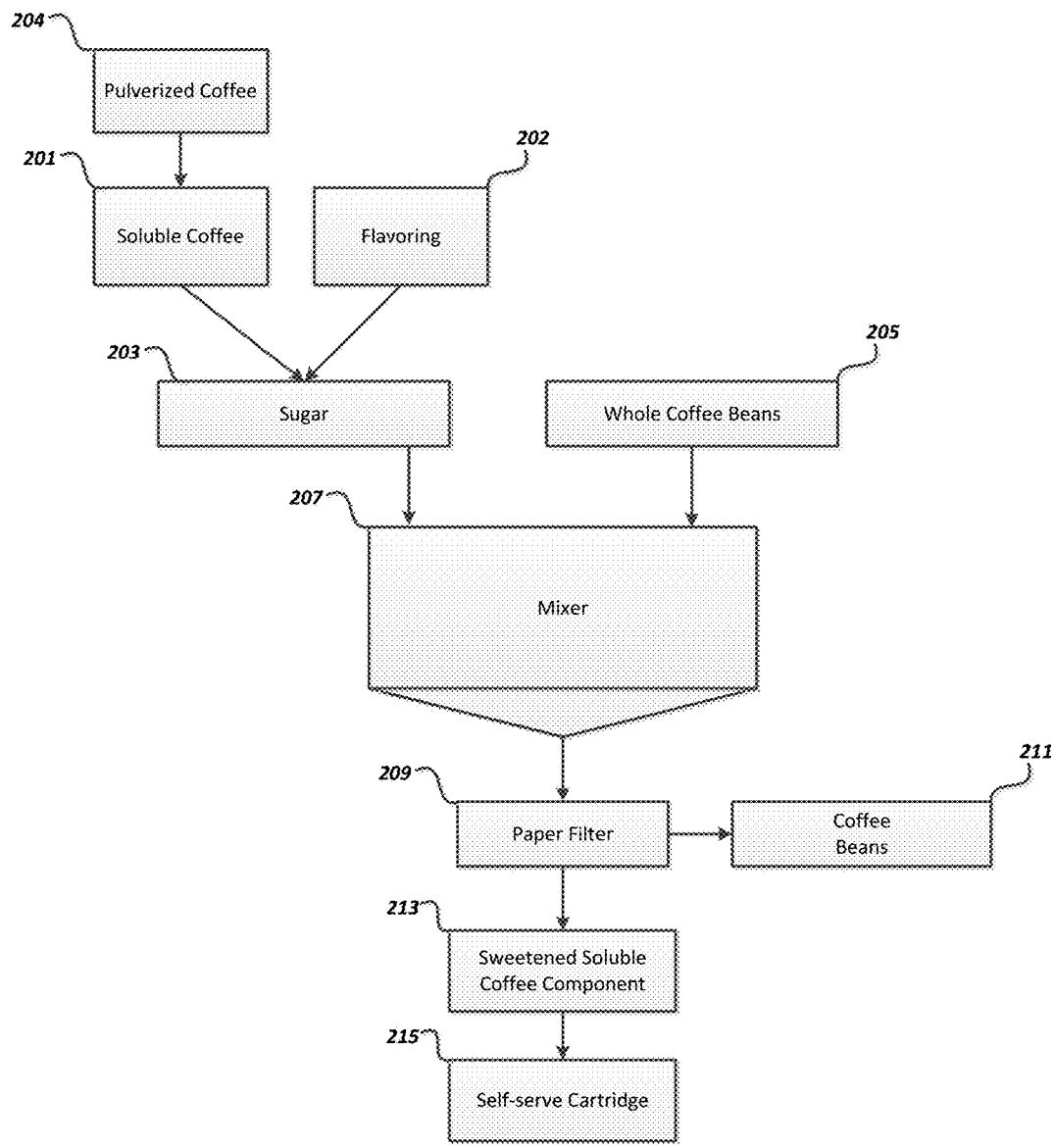
FIG. 2 is a process flow diagram illustrating an overview of one embodiment of a method of making a sweetened soluble coffee component.

FIG. 2 shows another example embodiment of the present disclosure. Referring to FIG. 2, pulverized coffee 204 is added to soluble coffee 201, which is combined with flavoring 202, sugar 203 and whole coffee beans 205 in a mixer 207 to form a mixture. The mixture is agitated for an amount of time, after which, a paper filter 209 is used to remove the coffee beans 211. The sweetened soluble coffee component 213 is retained and then placed in a self-serve cartridge 215.

Figure 3:
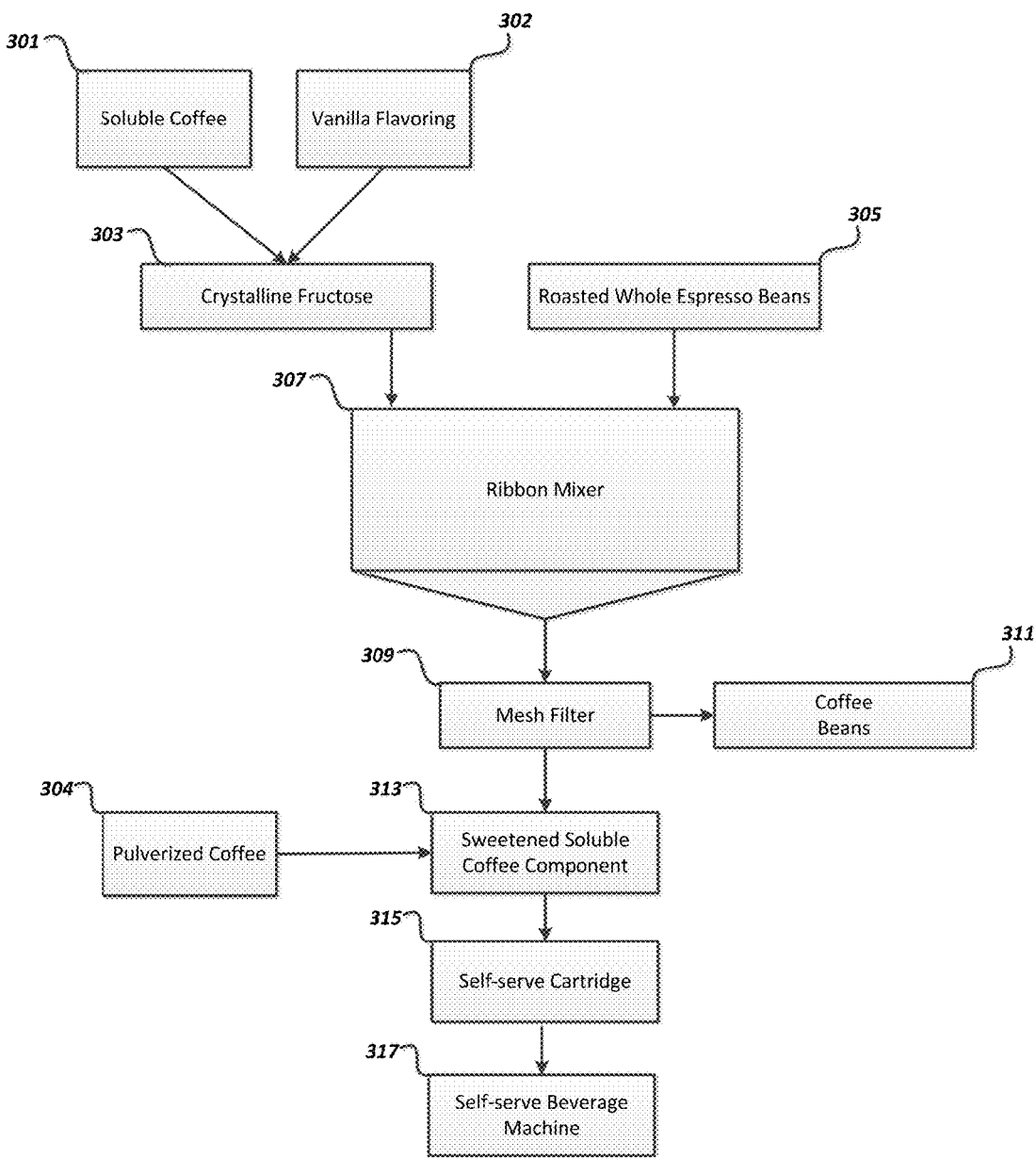
FIG. 3 is a process flow diagram illustrating an overview of one embodiment of a method of making a sweetened soluble coffee component.

Another example embodiment is shown in FIG. 3. Referring to FIG. 3, soluble coffee 301 is combined with vanilla flavoring 302, crystalline fructose 303 and roasted whole espresso beans 305 in a ribbon mixer 307 to form a mixture. The mixture is agitated for an amount of time, after which, a mesh filter 309 is used to remove the coffee beans 311. The sweetened soluble coffee component 313 is retained and pulverized coffee 314 is added. The combination of sweetened soluble coffee component 313 and pulverized coffee 304 is then placed in a self-serve cartridge 315. The self-serve cartridge can then be placed in a self-serve beverage machine 317 in order to prepare a beverage.

The sweetener used in the methods described herein is not particularly limited and may include, for example, cane sugar, fructose, corn syrup, crystalline fructose, dextrose, malto-dextrose, maltodextrin, glycerine, threitol, erythritol, rebaudioside A, stevia, xylitol, arabitol, ribitol, sorbitol, mannitol, maltitol, maltotriitol, maltotetraitol, lactitol, hydrogenated isomaltulose, hydrogented starch, shellac, ethyl cellulose, hydroxy propyl methylcellulose, starches, modified starches, carboxyl cellulose, carrageenan, cellulose acetate phthalate, cellulose acetate trimellitate, chitosan, corn syrup solids, dextrins, fatty alcohols, hydroxy cellulose, hydroxy ethyl cellulose, hydroxy methyl cellulose, hydroxy propyl cellulose, hydroxy propyl ethyl cellulose, hydroxy propyl methyl cellulose, hydroxy propyl methyl cellulose phthalate, polyethylene glycol or a combination thereof. In addition, the sweetener may have various levels of granularity. For example, granulated sugar, baker's sugar, sanding sugar, etc. may be used. In some embodiments a more highly granulated sweetener is used.

In some embodiments, about half of the sweetener to be used is first introduced to the vessel, followed by the amount of soluble beverage to be used, followed by the other half of the sweetener to be used; however the present embodiments are not so limited. In some embodiments, the soluble beverage and sweetener can be combined first and mixed for an amount of time. Then the whole coffee beans can be added and the resulting mixture mixed for a second amount of time. The ratio of sweetener to soluble beverage is not particularly limited and includes ratios of, for example, 1:100, 1:50, 1:10, 1:5, 1:1, 2:1, 3:1, 4:1, 5:1, 5.5:1, 6:1, 6.5:1, 7:1, 7.5:1, 8:1, 9:1, 10:1, 15:1, 20:1, 50:1 and 100:1. In some embodiments the ratio of sweetener to soluble beverage is about 5:1 to about 10:1. In certain embodiments the ratio of sweetener to soluble beverage is about 17:3.

Any type of agitation of the mixture of soluble beverage, sweetener and whole coffee beans can be used. Some examples include mixing, blending, tumbling, panning, hand mixing, ribbon blending, etc. In some embodiments, either or both mixing processes described above can be performed for 10 seconds, 30 seconds, 1 minute, 2 minutes, 3 minutes, 4 minutes, 5 minutes, 6 minutes, 7 minutes, 8 minutes, 9 minutes, 10 minutes, 11 minutes, 12 minutes, 13 minutes, 14 minutes, 15 minutes, 16 minutes, 17 minutes, 18 minutes, 19 minutes, 20 minutes, 25 minutes, 30 minutes, 40 minutes, 50 minutes, 60 minutes, 2 hours, 3 hours, 4 hours, 12 hours or more. In certain embodiments either or both mixing processes are performed for 1-15 minutes.

Some embodiments relate to soluble beverage components including pulverized coffee that has not been extracted. Such pulverized coffee can be added to the mixture, for example, before or after (or both before and after) the other ingredients are mixed with the whole coffee beans. In some embodiments, the pulverized coffee has a mean particle size, in diameter, of less than about 2000 microns, less than about 1500 microns, less than about 1000 microns, less than about 900 microns, less than about 800 microns, less than about 700 microns, less than about 600 microns, less than about 500 microns, less than about 450 microns, less than about 400 microns, less than about 350 microns, less than about 300 microns, less than about 250 microns in diameter, less than about 200 microns, less than about 150 microns, less than about 100 microns, or less than about 50 microns.

In some embodiments, the pulverized coffee has a median particle size, in diameter, of less than about 2000 microns, less than about 1500 microns, less than about 1000 microns, less than about 900 microns, less than about 800 microns, less than about 700 microns, less than about 600 microns, less than about 500 microns, less than about 450 microns, less than about 400 microns, less than about 350 microns, less than about 300 microns in diameter, less than about 250 microns, less than about 200 microns, less than about 150 microns, less than about 100 microns, or less than about 50 microns.

In some embodiments, the dry addition of pulverized coffee to dry coffee extract adds aroma, flavor complexity and body to the finished bulk product. The addition of pulverized coffee can be accomplished by one or more of many different methods, e.g., centrifugal equipment, lightning mixer, ribbon blender, PK blender, sonic methods, etc. In some embodiments, other compounds may be added during the process, including non-coffee oils, non-coffee aromas, coffee aromas, etc. In some embodiments, pulverized coffee can be encapsulated with carbohydrates, soy products, dairy ingredients or other agents. One advantage of the encapsulation is to protect against degradation from environmental factors. In some embodiments, encapsulation can also alter the rate of solubility of the coffee components so that coffee aroma components and coffee flavor components are released from the pulverized or ground coffee at different times compared to other ingredients in the coffee product.

Coffee aromas are volatile components of coffee that produce the characteristic fragrance of coffee. In some embodiments, the coffee aroma can be provided to the final beverage component in the form of a highly aromatized coffee concentrate. The aromatized coffee concentrate is prepared by adding coffee aroma to a coffee concentrate. Methods of preparing coffee concentrates are well known to one of skill in the art.

In some embodiments, coffee aroma is added to the sweetened soluble beverage component. Such coffee aroma can be in the form of natural coffee aroma components that are collected during the preparation of soluble coffee powder. In some embodiments, the natural coffee aroma includes highly volatile aroma components. Highly volatile aroma components are those which condense at a temperature below about 0° C. To recover highly volatile aroma components, volatile aroma components may be flushed from the coffee during processing using an inert carrier gas such as nitrogen, carbon dioxide gas or carbon dioxide pellets, for example. The aroma-laden carrier gas is then chilled to temperatures lower than about −40° C., and sometimes as low as about −195° C., to cause the aroma components to condense. The condensed aroma components are then collected. Suitable procedures for capturing coffee aroma are known to one of skill in the art.

In some embodiments, the encapsulation of beverage components can be used to optimize product functionality, particle size and/or create a new product form. Encapsulation can be done with one or more products including, for example, coffee, coffee extracts, coffee concentrates, dry pulverized coffee, coffee oils or other oils, aromas, functional ingredients, etc. In addition, encapsulation can also done with one or more of carbohydrates, soy products, dairy products, corn syrup, hydrocolloids, polymers, waxes, fats, vegetable oils, gum arabic, lecithin, sucrose-esters, mono-diglycerides, pectin, K-carbonate, K-bicarbonate, Na-carbonate, $Na_3PO_4$, $K_3PO_4$, maltodextrin, glycerine, threitol, erythritol, xylitol, arabitol, ribitol, sorbitol, mannitol, maltitol, maltotriitol, maltotetraitol, lactitol, hydrogenated isomaltulose, hydrogented starch, liposomes, liposomes in sol-gels, shellac, hydrolyzed fats, ethyl cellulose, hydroxy propyl methylcellulose, starches, modified starches, alginate and alginic acid (e.g., sodium alginate), calcium caseinate, calcium polypectate, carboxyl cellulose, carrageenan, cellulose acetate phthalate, cellulose acetate trimellitate, chitosan, corn syrup solids, dextrins, fatty acids, fatty alcohols, gelatin, gellan gums, hydroxy cellulose, hydroxy ethyl cellulose, hydroxy methyl cellulose, hydroxy propyl cellulose, hydroxy propyl ethyl cellulose, hydroxy propyl methyl cellulose, hydroxy propyl methyl cellulose phthalate, lipids, liposomes, low density polyethylene, mono-, di- and triglycerides, pectins, phospholipids, polyethylene glycol, polylactic polymers, polylactic co-glycolic polymers, polyvinyl pyrolindone, stearic acid and derivatives, xanthum and proteins, zein, gluten or other agents to protect against environmental elements.

Also, additional flavoring can be added to the soluble beverage, sweetener or sweetened soluble beverage component at any time during processing. Non-limiting examples of flavoring include vanilla, chocolate, hazelnut, caramel, cinnamon, mint, eggnog, apple, apricot, aromatic bitters, banana, berry, blackberry, blueberry, celery, cherry, cranberry, strawberry, raspberry, juniper berry, brandy, cachaca, carrot, citrus, lemon, lime, orange, grapefruit, tangerine, coconut, cola, menthol, gin, ginger, licorice, hot, milk, nut, almond, macadamia nut, peanut, pecan, pistachio, walnut, peach, pear, pepper, pineapple, plum, quinine, rum, white rum, dark rum, sangria, shellfish, clam, tea, black tea, green tea, tequila, tomato, top note, tropical, vermouth, dry vermouth, sweet vermouth, whiskey, bourbon whiskey, Irish whiskey, rye whiskey, Scotch whisky, Canadian whiskey, red pepper, black pepper, horseradish, wasabi, jalapeno pepper, chipotle pepper essential oils, concretes, absolutes, resins, resinoids, balms, tinctures, soybean oil, coconut oil, palm oil, kern oil, sunflower oil, peanut oil, almond oil, cocoa butter, amyris oil, angelica seed oil, angelica root oil, aniseed oil, valerian oil, basil oil, tarragon oil, eucalyptus citriodora oil, eucalyptus oil, fennel oil, fir needle oil, galbanum oil, galbanum resin, geranium oil, grapefruit oil, guaiac wood oil, guaiac balsam, guaiac balsam oil, helichrysum absolute, helichrysum oil, ginger oil, iris root absolute, iris root oil, jasmin absolute, calmus oil, chamomile oil bleu, chamomile oil roman, carrot seed oil, cascarilla oil, mint oil, carvi oil, labdanum oil, labdanum absolute, labdanum resin, lavandin absolute, lavandin oil, lavender absolute, lavender oil, lemongrass oil, Bursera penicillata (linaloe) oil, litsea-cubeba oil, bay laurel leaf oil, macis oil, marjoram oil, mandarin oil, massoirinde oil, mimosa absolute, ambrette seed oil, ambrette tincture, muskatelle salbei oil, nutmeg oil, orange blossom absolute, orange oil, oregano oil, palmarosa oil, patchouli oil, perilla oil, parsley leaf oil, parsley seed oil, clove seed oil, peppermint oil, pepper oil, pimento oil, pine oil, poley oil, rose absolute, rose wood oil, rose oil, rosemary oil, sage oil, lavandin, sage oil Spanish, sandalwood oil, celery seed oil, lavender spike oil, star anis oil, styrax oil, tagetes oil, pine needle oil, tea-tree oil, turpentine oil, thyme oil, tolu balm, tonka absolute, tuberose absolute, vanilla extract, violet leaf absolute, verbena oil, vetiver oil, juniper berry oil, wine yeast oil, wormwood oil, wintergreen oil, ylang ylang oil, hyssop oil, civet absolute, cinnamon leaf oil, cinnamon bark oil etc. any other type of food flavoring or edible substance or a combination thereof.

In some embodiments, the sweetened soluble beverage component is placed in a single-serve beverage cartridge. A single-serve beverage cartridge can be configured for use in a single-serve beverage machine, such as an automatic single-serve coffee brewer. The term "cartridge" as used herein shall be given its ordinary and customary meaning, and shall include, without limitation, cartridges, capsules, cups, sachets, pucks, pods and the like.

Figure 4:
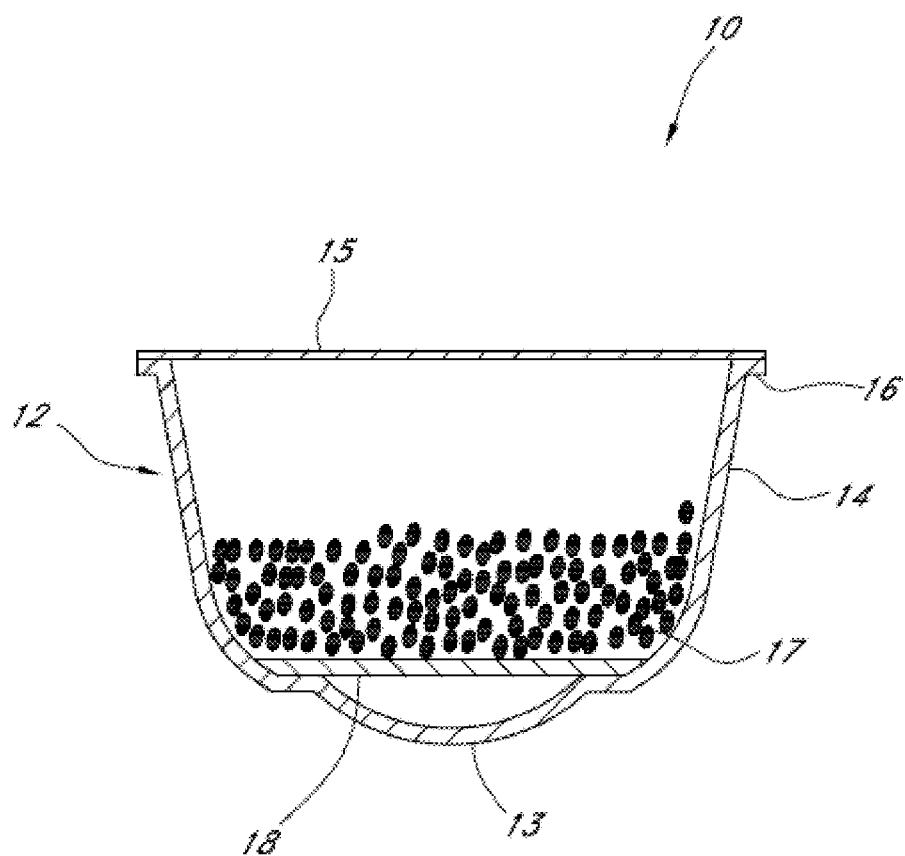
FIG. 4 is a schematic representation of a beverage cartridge according to certain embodiments of the present disclosure.

Referring to FIG. 4, a cartridge 10 can include a cup 12, a lid 15 and a filter 18. In some embodiments, the cartridge has no filter. The cup 12 has a generally hollow structure having a bottom wall 13, a shoulder 16 and a sidewall 14. The cartridge 10 can have a gradually tapered, generally cylindrical shape; however, other shapes can be used without departing from the spirit and/or scope of the disclosure.

The cup can include an outwardly extending rim. The lid 15 can be secured, adhered, or otherwise connected with the outwardly extending rim or adjacent thereto, thereby forming a sealed cartridge. The seal can be an airtight seal to reduce entry of ambient air into the cartridge and thus promote freshness of the beverage component. The lid 15 can be secured or adhered to the cartridge using any suitable adhesive or sealing techniques and materials, such as heat-sealing, crimping, gluing, UV-curing, applying ultrasonic or microwave energy (e.g., sonic welding), and otherwise.

In some embodiments, the cartridge can be vacuum sealed or pressurized. In some embodiments, the oxygen or ambient air in the cartridge is replaced with nitrogen (or another generally non-reactive gas). In certain other embodiments, the oxygen or ambient air in the cartridge is replaced with a combination of nitrogen and carbon-dioxide. Replacement of the oxygen or ambient air in the cartridge can, for example, enhance the shelf-life of the cartridge and reduce the chance of spoliation or degradation of the contents of the cartridge. In some embodiments, one or more portions of the cartridge (e.g., the cup and/or the lid) are configured to limit or otherwise control the transmission of water vapor and/or oxygen between the beverage component and an external environment (e.g., ambient air) in order to provide an acceptable shelf life. For example, in some cases, the lid 15 has a water vapor transmission rate of less than or equal to about 0.050 g/m$^2$/day (measured as per ASTM F-1249). In certain embodiments, the lid 15 has an oxygen transmission rate of less than or equal to about 0.500 cc/m$^2$/day (measured as per ASTM D3985). Those skilled in the art will recognize that such transmission rates are illustrative and thus, should not be construed as limiting. In some instances, an acceptable shelf life is between about 6 months and about 12 months after assembly of the cartridge. However, depending on the contents of the cartridge, a shelf life that is shorter (e.g., about 3 months) or longer (e.g., about 18 months) may be applicable and is contemplated by this disclosure.

The cartridge can include a single serving, or single-serve portion, of the beverage component, such as instant coffee, tea, fruit juice, soft drink, or any other beverage that can be produce by mixing one or more substantially soluble beverage components with a fluid. The term soluble as used herein shall be given its ordinary and customary meaning, and shall include, without limitation, products that readily dissolve or disperse in a liquid, such as water or milk.

In some embodiments, the beverage component includes microground or pulverized coffee, such as that described in U.S. Patent Application Publication No. 2010/0009039, filed Jul. 9, 2008, and titled "METHOD OF MAKING BEVERAGES WITH ENHANCED FLAVORS AND AROMAS," the entirety of which is incorporated herein by reference. For example, in some cases, the instant beverage component includes coffee having a median or mean particle size of about 350 microns or less. In some embodiments, the beverage component includes a combination of dry coffee extract and microground coffee. In certain embodiments, the beverage component includes freeze-dried coffee. In some embodiments, the beverage component includes a combination of freeze-dried coffee and microground coffee. In certain instances, the instant beverage component includes particulate matter, such as particulates of microground coffee.

The type and amount of beverage component can be selected to provide a beverage having certain desired characteristics. For example, the amount of soluble beverage component 17 can be selected to deliver a predetermined strength of beverage. In some embodiments, the beverage component can include dairy, soy, sugar, artificial sweeteners, nutrients, flavorings, or other components, in addition to, for example, coffee or tea.

The beverage component can be provided in the cup in many forms. For example, in some embodiments, the beverage component is generally loose and non-compressed. In another embodiment, the beverage component is generally compressed and/or compacted.

The cup 12 and the lid 15 can be constructed of a liquid-impermeable material that is capable of being pierced or perforated by a piercing member of a single-serve beverage machine to allow the introduction of liquid (e.g., hot water or cold water) into the cartridge. For example, the cup 12 and the lid 15 can be made of one or more metallic (e.g., aluminum), paper-based, polymeric (e.g., plastic, polyethylene, polyurethane, nylon), and/or biodegradable materials. In some embodiments, the cup 12 and/or the lid 15 is constructed of a flexible material. In certain instances, the lid 15 of the cartridge can be pierced or perforated by a piercing member. In such cases, liquid can be injected or otherwise delivered through a piercing member and/or the opening created therefrom into the cup 12, thereby forming a beverage within the cup 12. In other instances, the lid 15 may be constructed of a gas and/or water permeable material that allows a liquid, such as water, to pass through without requirement piercing of the lid.

In some embodiments, the introduction of liquid into the cartridge encourages mixing of the liquid and the beverage component. For example, the liquid can be introduced as a pressurized (e.g., between about 0.5 bars and about 20 bars) stream, which can impinge the beverage component and/or the cup 12 (e.g., the bottom wall 13) and facilitating mixing. In some embodiments, the liquid is injected in a manner such that liquid and instant beverage component are effectively churned or swirled within the cup 12, thereby allowing the beverage particles to be dispersed and/or dissolved more readily. For example, in some such cases the liquid is injected in a cyclonic fashion.

Generally, the liquid introduced into the cartridge is water, but most any type of liquid can be used. For example, in some embodiments, the liquid is milk, such as for the preparation of hot cocoa. In other embodiments, the liquid is a juice. In some embodiments, the liquid is carbonated, such as for the preparation of a soft drink. In certain embodiments, the liquid is alcoholic, such as for the preparation of a shot or a cocktail. In some instances, a hot liquid is introduced, e.g., for hot beverages. In other instances, a cold liquid is introduced, e.g., for iced beverages. The amount of liquid introduced can be predetermined or adjusted based on a desired strength of the beverage.

In some embodiments, after the cartridge has been pierced by a first piercing member, the liquid has been introduced into the cartridge, and the beverage components have been at least partly mixed with and/or dissolved into the liquid, the beverage is ready to exit the cartridge. Accordingly, in some instances, the cup 12 can be configured to provide a location for the liquid to exit the cartridge. For example, the bottom wall 13 can be configured to be pierced or perforated by a piercing member to allow the prepared beverage to exit the cartridge. The piercing member can be a hollow needle or cannula-like element, such that the prepared beverage can flow through the second piercing member for delivery to a cup or other beverage receptacle for consumption (e.g., via a discharge spout). In some embodiments, the prepared beverage does not flow through a piercing member, rather the prepared beverage exits via a hole or opening formed by a piercing member. In certain embodiments, a piercing member pierces approximately the center (e.g., radial center) of the bottom wall 13. In yet other embodiments the cartridge may be fabricated with one or more holes or openings in the bottom wall 13. In such embodiments, the hole(s) may be sealed by a removable tab or other covering that may be stripped from the bottom wall 13 prior to use. In yet other embodiments, the bottom wall 13 is constructed of a gas and/or impermeable material that allows the formed beverage to pass through without requiring piercing or removal of any tab or covering.

In certain arrangements, components of the cartridge are constructed of a flexible material. For example, in some embodiments, the cup 12 is sufficiently flexible to be able to collapse and expand. Such a configuration can, for example, reduce the storage space occupied by the cartridge and reduce the likelihood of air or other gasses spoiling or otherwise degrading the instant beverage component. In some cases, the cup 12 is collapsed around the instant beverage component. In some cases, air or other gases are substantially evacuated from the cartridge. In some embodiments, the cup 12 is configured to expand when the liquid is introduced into the cartridge. In certain such cases, the cup 12 expands to about its size and shape prior to collapse.

In various embodiments, the cartridges described herein are made of biodegradable or otherwise "environmental friendly" materials. The cartridges described herein can be configured for single use. The cartridges described herein can be compatible with one or more existing single-serve beverage machines or technologies.

EXAMPLES

The following examples are provided for illustrative purposes only, and are in no way intended to limit the scope of the present embodiments.

Example 1

Preparation of a Sweetened Soluble Coffee Component

Into a ribbon mixer, 600 pounds of soluble coffee were combined with 4200 pounds of sugar to form a mixture. First, 2100 pounds of sugar were placed in the ribbon mixer, and then the 600 pounds of soluble coffee were added to the mixer. Then 2100 additional pounds of sugar were added to the mixture. The mixture was then mixed for about four minutes. Roasted whole espresso beans were then added to the mixture, which was then mixed again for about three minutes. The mixture was then passed through a mesh to remove the coffee beans and placed into a self-serve cartridge which was sealed.

Example 2

Preparation of a Vanilla-Flavored Sweetened Soluble Coffee Component

Into a ribbon mixer, 600 pounds of soluble coffee were combined with 4200 pounds of sugar and vanilla flavor powder to form a mixture. First, 2100 pounds of sugar were placed in the ribbon mixer, followed by vanilla flavor powder and then the 600 pounds of soluble coffee were added to the mixer. Then 2100 pounds of sugar were added to the mixture. The mixture was then mixed for about four minutes. Roasted whole espresso beans were then added to the mixture, which was then mixed again for about three minutes. The mixture was then passed through a #8 mesh to remove the coffee beans and placed into a self-serve cartridge which was sealed.

Example 3

Preparation of a Cocoa-Flavored Sweetened Soluble Coffee Component

Into a ribbon mixer, 600 pounds of soluble coffee are combined with 4200 pounds of sugar and cocoa flavor powder to form a mixture. First, 2100 pounds of sugar are placed in the ribbon mixer, followed by cocoa flavor powder and then the 600 pounds of soluble coffee were added to the mixer. Then 2100 additional pounds of sugar are added to the mixture. The mixture is then mixed for about four minutes. Roasted whole espresso beans are then added to the mixture, which is then mixed again for about three minutes. The mixture is then passed through a #8 mesh to remove the coffee beans and placed into a self-serve cartridge which is then sealed.

Example 4

Preparation of a Sweetened Soluble Cocoa Component

Into a ribbon mixer, 600 pounds of cocoa powder are combined with 4200 pounds of sugar to form a mixture. First, 2100 pounds of sugar are placed in the ribbon mixer, followed by 600 pounds of cocoa flavor powder. Then 2100 additional pounds of sugar are added to the mixture. The mixture is then mixed for about four minutes. Roasted whole espresso beans are then added to the mixture, which is then mixed again for about three minutes. The mixture is then passed through a #8 mesh to remove the coffee beans and placed into a self-serve cartridge which is then sealed.

Although certain embodiments have been described herein with respect to coffee, the methods and compositions described herein can include particulate materials or components for producing many other types of beverages, such as a chocolate based product (e.g., hot cocoa), tea, juice, and other beverages. Further, although some embodiments have been disclosed in which liquid is introduced into a cartridge, the introduction of other phases is contemplated. For example, in some embodiments, steam or a combination of steam and liquid water is introduced into a cartridge. Additionally, although certain embodiments have been disclosed that include a beverage component, the term "beverage component" is not limited to only a single component. Rather, the beverage component can comprise one component or a plurality of components.

Conditional language, for example, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although certain embodiments and examples have been described herein, it will be understood by those skilled in the art that many aspects of the methods and devices shown and described in the present disclosure may be differently combined and/or modified to form still further embodiments or acceptable examples. All such modifications and variations are intended to be included herein within the scope of this disclosure. A wide variety of designs and approaches are possible. No feature, structure or step disclosed herein is essential or indispensible.

Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or group of advantages as taught herein without necessarily achieving other advantages as may be taught or suggested herein.

What is claimed is:

1. A method of making a sweetened soluble beverage product, the method comprising:
   combining a soluble beverage component, a sweetener and coffee beans in a vessel to form a mixture;
   agitating the mixture for a predetermined amount of time; and
   removing the coffee beans from the mixture,
   wherein the sweetened soluble beverage product comprises the soluble beverage component and the sweetener.

2. The method of claim 1, wherein the sweetener comprises sugar.

3. The method of claim 1, wherein the sweetener comprises granular sugar.

4. The method of claim 1, wherein the soluble beverage component comprises soluble coffee.

5. The method of claim 1, wherein the mixture contains pulverized coffee beans.

6. The method of claim 1, wherein the coffee beans comprise roasted whole coffee beans.

7. The method of claim 5, wherein the pulverized coffee beans have a mean or median particle size of less than about 350 microns.

8. The method of claim 1, wherein agitating the mixture comprises at least one of mixing, blending, tumbling and panning.

9. The method of claim 1, wherein removing the coffee beans from the mixture comprises filtering the mixture.

10. The method of claim 1, wherein the sweetened soluble beverage product comprises oil from the coffee beans imparted to the soluble beverage component and sweetener prior to removing the coffee beans from the mixture.

11. The method of claim 1, further comprising adding to the mixture at least one of a dairy component, a spice, a cocoa, a fruit powder and a flavoring component.

12. The method of claim 1, further comprising placing the sweetened soluble beverage product into a self-serve cartridge.

* * * * *